Figure 1:
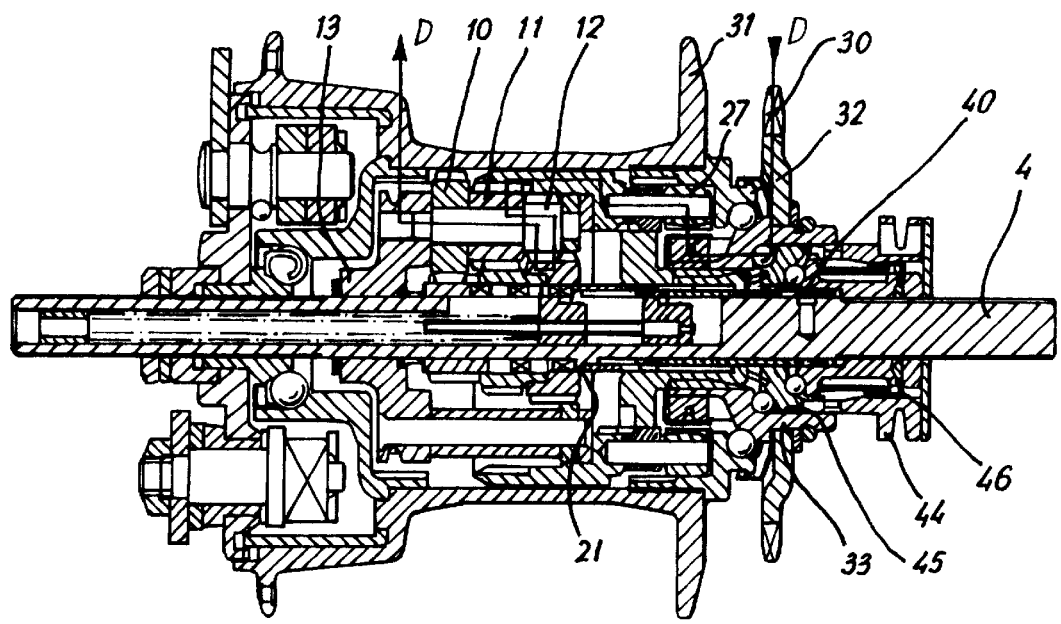

United States Patent [19]
Rickels

[11] Patent Number: 5,769,750
[45] Date of Patent: Jun. 23, 1998

[54] EPICYCLIC CHANGE GEAR SYSTEM

[75] Inventor: Stephen Terence Rickels, Nottingham, England

[73] Assignee: Sturmey-Archer Limited, Nottingham, United Kingdom

[21] Appl. No.: 737,485

[22] PCT Filed: May 16, 1995

[86] PCT No.: PCT/GB95/01106

§ 371 Date: Jan. 27, 1997

§ 102(e) Date: Jan. 27, 1997

[87] PCT Pub. No.: WO95/31365

PCT Pub. Date: Nov. 23, 1995

[30]     Foreign Application Priority Data

May 17, 1994  [GB]  United Kingdom ................... 9409844

[51] Int. Cl.⁶ .............................. B62M 11/16; F16H 3/66
[52] U.S. Cl. .......................... 475/298; 475/300; 192/6 A
[58] Field of Search ..................................... 475/298, 300; 192/6 A; 280/260, 261

[56]           References Cited

U.S. PATENT DOCUMENTS 1,249,659  5/1917  Olsen .................................. 475/300 X
1,422,508  7/1922  Wheeler ................................... 475/298
1,490,644  4/1924  Sturmey et al. ......................... 475/298
2,301,852  11/1942  Brown .................................. 475/300 X
3,438,283  4/1969  Schwerdhofer ..................... 475/300 X
4,721,013  1/1988  Steuer et al. ......................... 475/300 X

FOREIGN PATENT DOCUMENTS

A2458871  6/1975  Germany .
2014260   8/1979  United Kingdom .
2166503   5/1986  United Kingdom ................... 475/298
2249364   5/1992  United Kingdom .
2275512   8/1994  United Kingdom ................... 475/298
94/20358  9/1994  WIPO .................................... 475/298

*Primary Examiner*—Khoi Q. Ta
*Attorney, Agent, or Firm*—Salter & Michaelson

[57]            ABSTRACT

An epicyclic change speed gear comprises a fixed spindle (4) and side-by-side sun pinions (1, 2, 3) rotatable on the spindle. A gear selector key (5) is adapted for selective cooperative engagement with one of the sun pinions to lock that pinion to the spindle. The key (5) is operated by a sleeve (15) disposed for rotational movement relative to the spindle (4). Rotation of the sleeve (15) displaces the key (5) axially to lock the selected sun pinion. One or both axial ends of the sleeve (15) are angled such that different degrees of rotation cause different axial displacements of the key (5) and cause different sun pinions to be locked.

15 Claims, 8 Drawing Sheets

EPICYCLIC CHANGE GEAR SYSTEM

The present invention relates to an epicyclic change gear system for a bicycle or the like.

It is known in the art to provide a five speed epicyclic change speed gear hub for a bicycle by utilising compound planet gears engaged with a common gear ring and each cooperable with a respective sun gear selectively engageable therewith in a drive transmission mode.

In such an arrangement the sun gears are rotatably and slidably mounted on the hub spindle for unitary movement in the axial direction thereof for the selective dogged engagement of one or other of the sun gears with a respective formation non-rotatably fixed to the spindle.

The planet cage of the aforesaid arrangement is connectable with the hub shell, so as to provide a drive transmission from the planet cage to the hub shell according to hub condition, by means of axially movable pawls mounted in the planet cage and cooperable with ratchet teeth provided in a hub end cap. The gear ring is connectable with the hub shell through radial pawls.

It is also known from our copending Patent Application No. GB-A-2249364 for a sun gear to be axially fixed with respect to the spindle and to provide a selector key movable axially of the spindle for selective engagement with a respective one of the sun gears so as non-rotatably to secure that sun gear to the spindle.

An object of the present invention is to provide the capability for an even greater range of gears.

According to the present invention, there is provided an epicyclic change speed gear comprising a fixed spindle, an input member and an output member, planet pinions disposed in a planet cage, a gear ring is operatively connected to the output member or input member, a clutch operative to connect the input member to the planet cage or the input member to the gear ring, side-by-side sun pinions rotatable on the spindle any one of which is operable to provide a reaction member when locked to the spindle and a gear selector key disposed radially inwardly of said sun pinions and adapted for selective cooperative engagement with said only one of the said sun pinions on movement of the selector key in the axial direction of the hub in order to lack the corresponding sun pinion to the spindle to provide the reaction member, and means for operating the selector key to provide said selective cooperative engagement characterised in that the means for operating the selector key comprises a sleeve disposed for rotational movement relative to the spindle relative rotational movement of the sleeve resulting in axial movement of the selector key.

The precharacterising portion of the invention as outlined above is based upon the above mentioned patent application No. GB-A-2249364.

In a preferred embodiment of the invention, at least one axial edge thereof is angled to the axis of the sleeve so that on rotation of the sleeve on the spindle the axial extent of the sleeve between a fixed point on the spindle and the selector key is varied thereby moving the key axially with respect to that fixed point. A pin may be attached to the spindle at the fixed point to form an abutment for the sleeve. The pin may be rotatable with respect to the sleeve. Advantageously, both axial ends of the sleeve may be similarly angled so that the axial displacement of the key is doubled for a given rotational movement of the sleeve. The or each angled edge may be formed with steps corresponding to given axial positions of the key in which given sun pinions are locked to the spindle. An outer cam follower is keyed to the sleeve. This cam follower is locked with respect to the sleeve in the rotational sense, but may move axially with respect thereto. If desired the sleeve could be made with its axial ends at right angles to the axis of the sleeve. Rotational thereof would then only produce movement of the outer cam follower and not of the key thus reducing the number of gear ratios provided with one sun pinion to two or three. In operation the cam follower moves a clutch away from the planet cage against the reaction of an outer sleeve cam. Alternatively the clutch may be moved towards the planet cage using the pin in the spindle as the reaction instead of the outer sleeve cam. The sleeve and other parts may be made by pressing and forming which is a less expensive operation than machining.

According to another aspect of the present invention there is provided an epicyclic change speed gear comprising a fixed spindle, an input member and an output member, planet pinions disposed in a planet cage which may be operatively connected to the output member or the input member, a gear ring which may be operatively connected to the output member or input member, a clutch operative to connect the input member to the planet cage or the input member to the gear ring, sun pinions locked to the spindle characterised in that a sleeve is disposed for rotational movement relative to the spindle and has opposite axial ends at right angles to the axis of the sleeve and a cam, cam follower combination is provided operative to move the clutch in order to connect the input member to the planet cage or the input member to the gear ring as the case may be, on rotational movement of the sleeve.

Figure 1A:
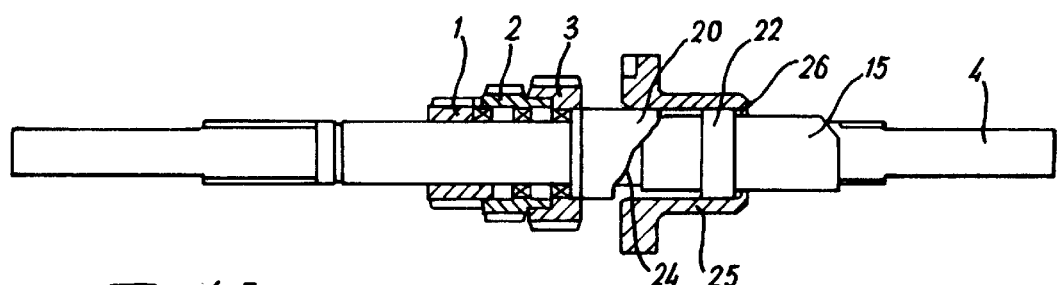
Figure 1B:
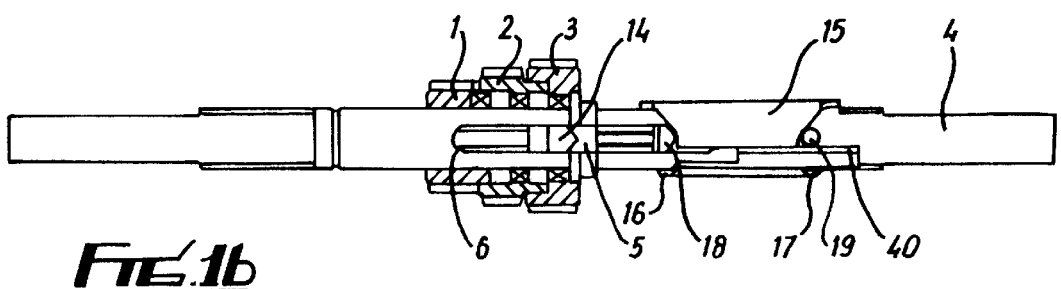
Figure 2:
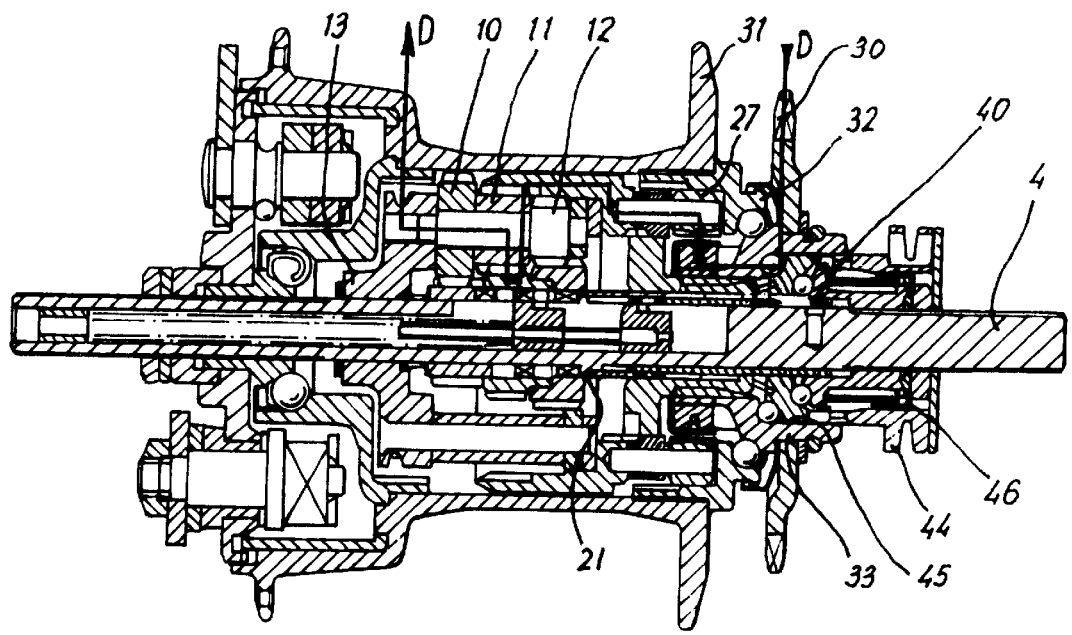
Figure 2A:
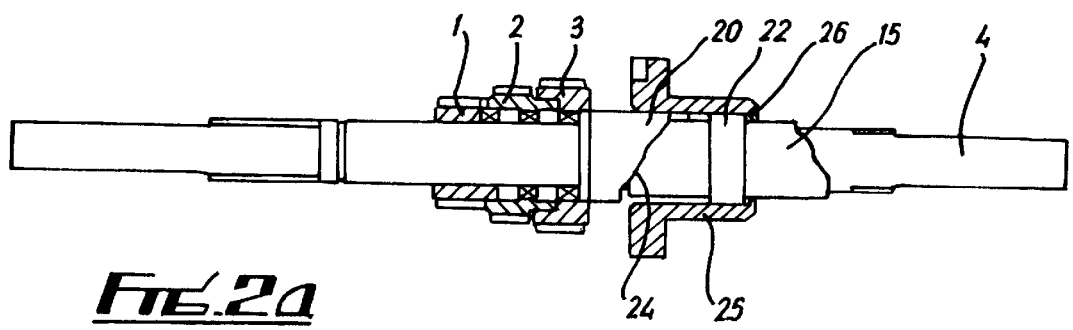
Figure 2B:
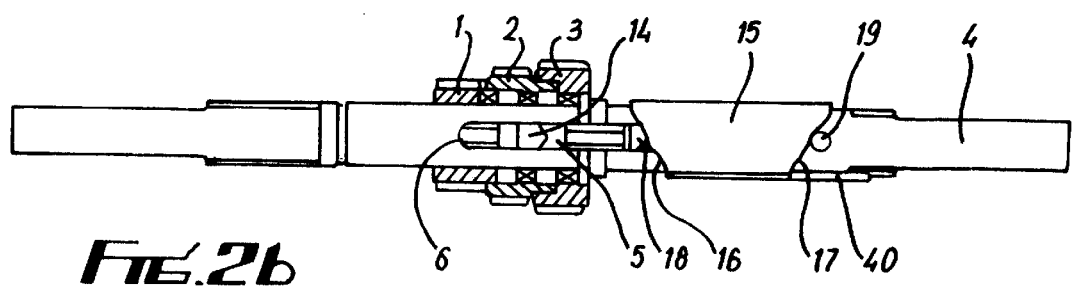
Figure 3:
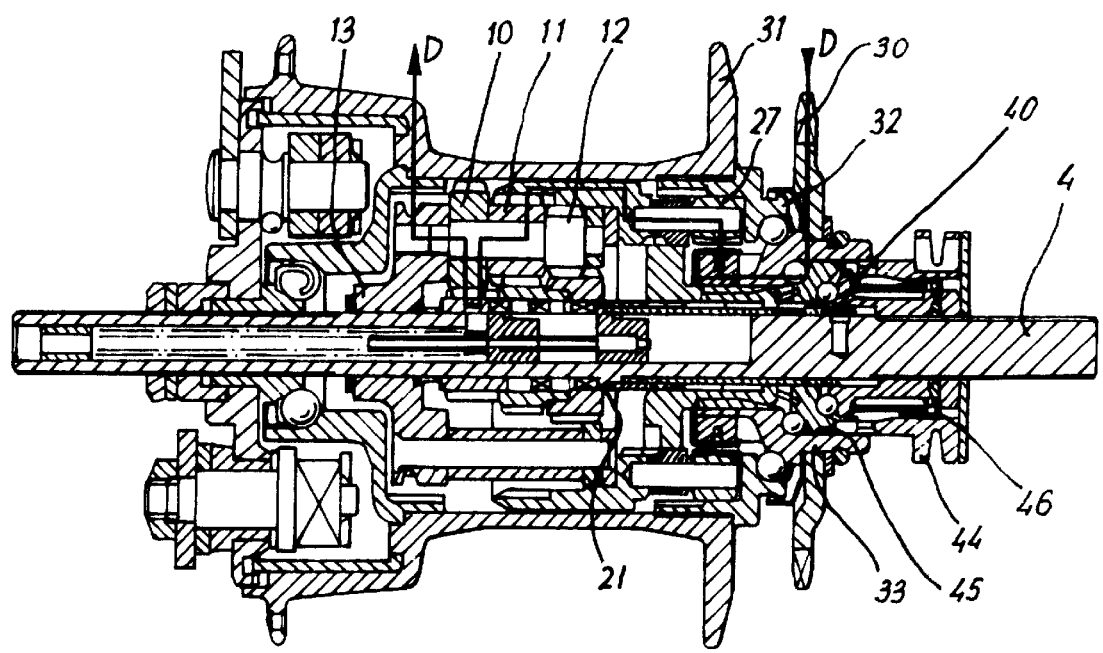
Figure 3A:
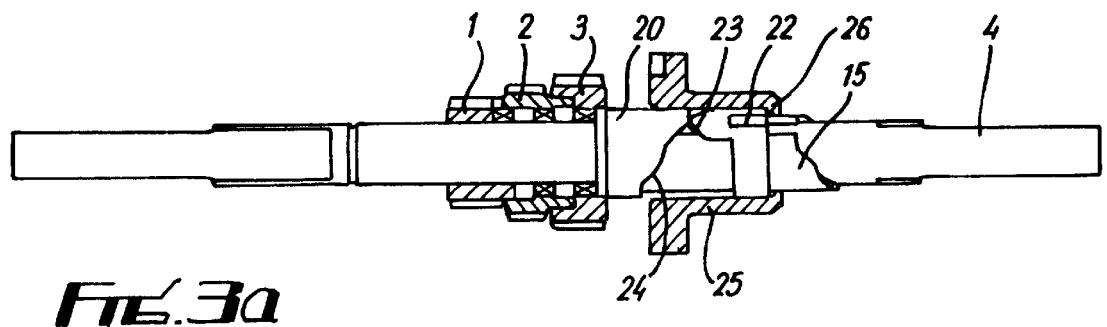
Figure 3B:
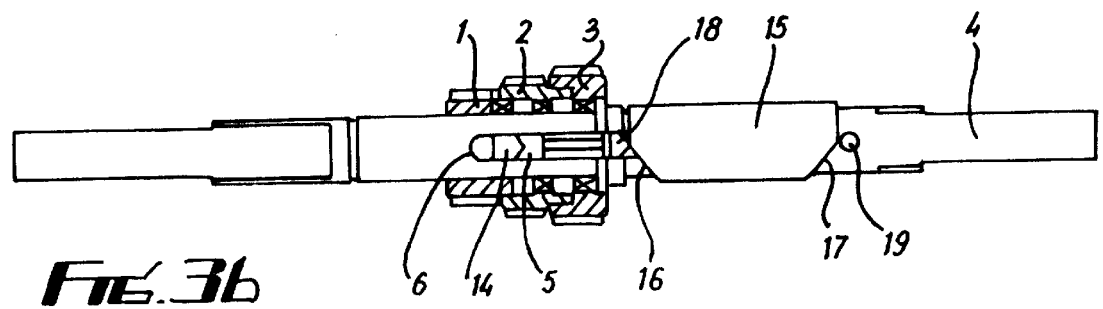
Figure 4:
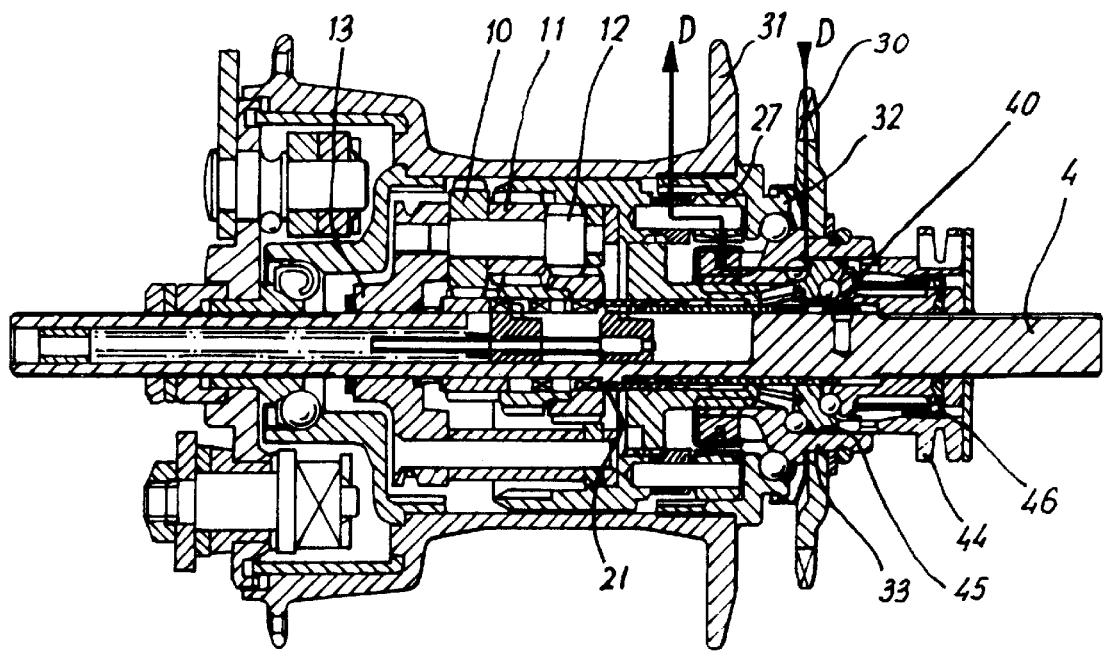
Figure 4A:
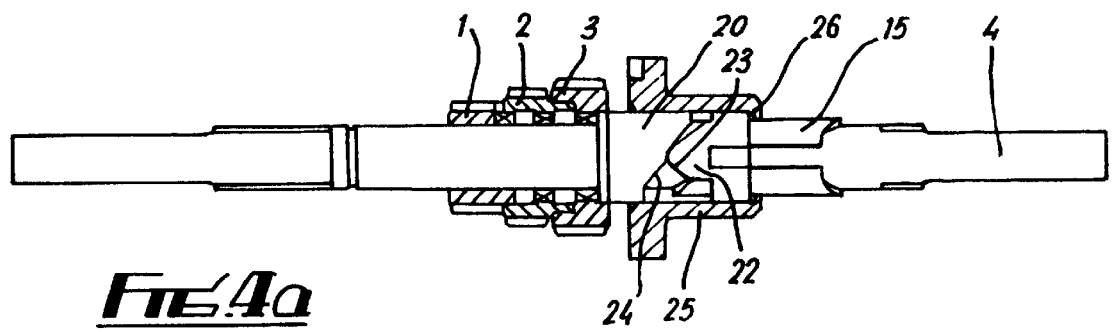
Figure 4B:
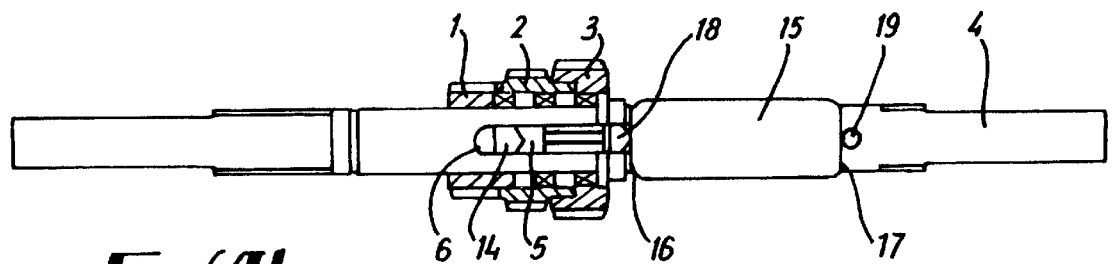
Figure 5:
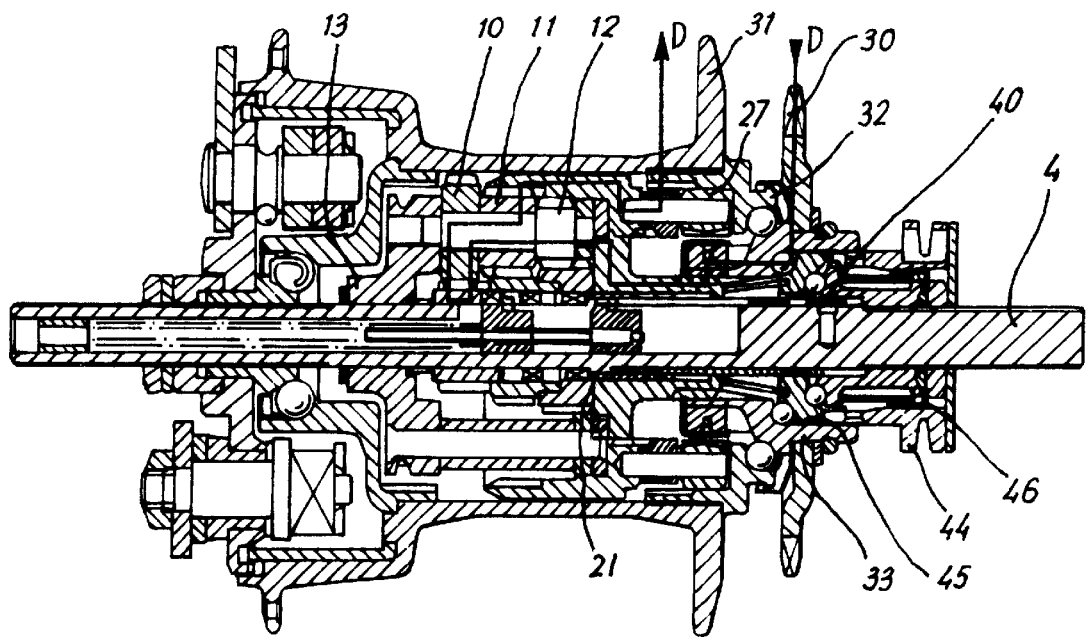
Figure 5A:
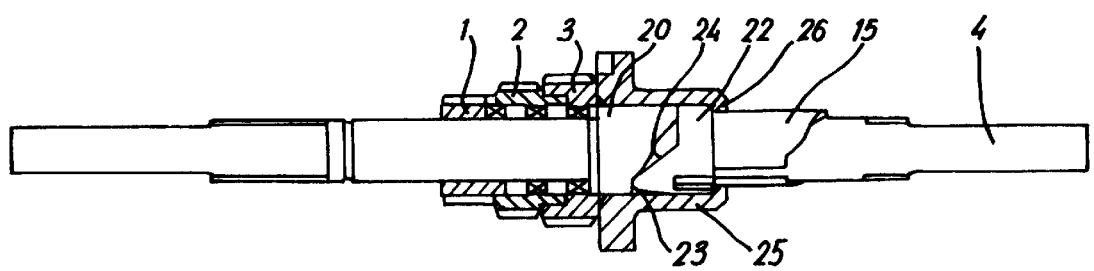
Figure 5B:
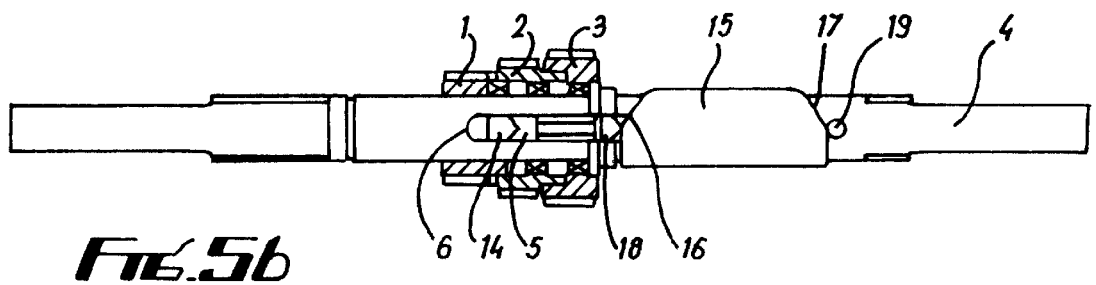
Figure 6:
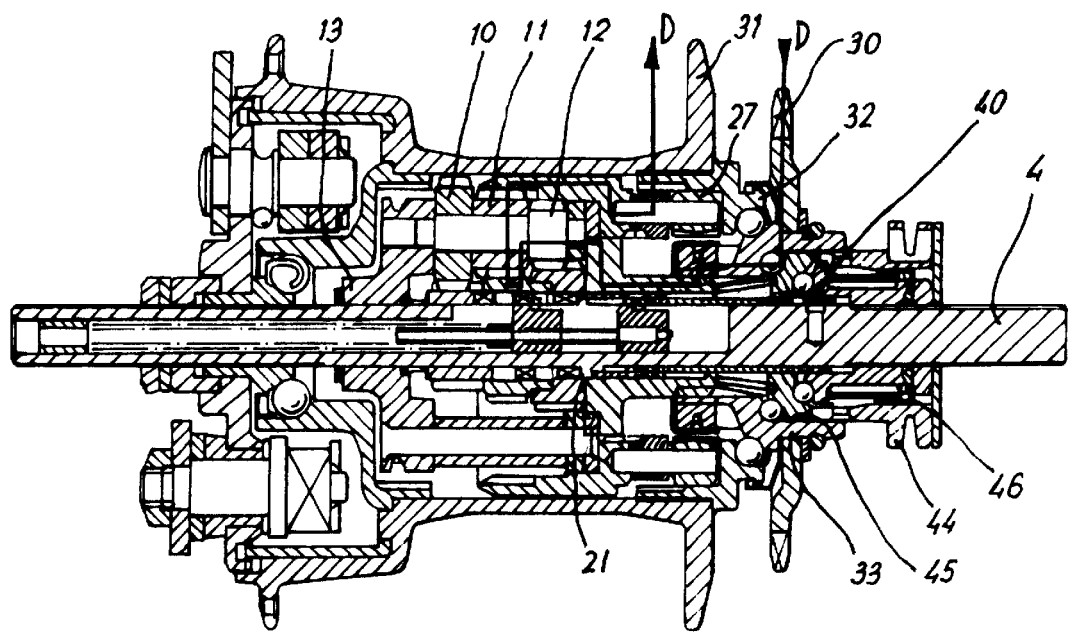
Figure 6A:
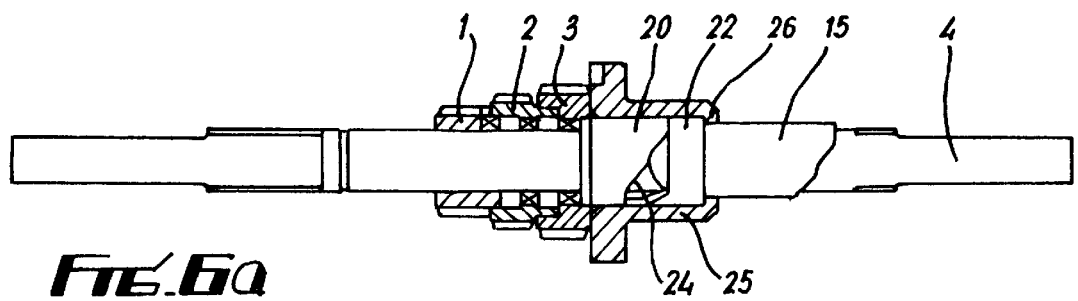
Figure 6B:
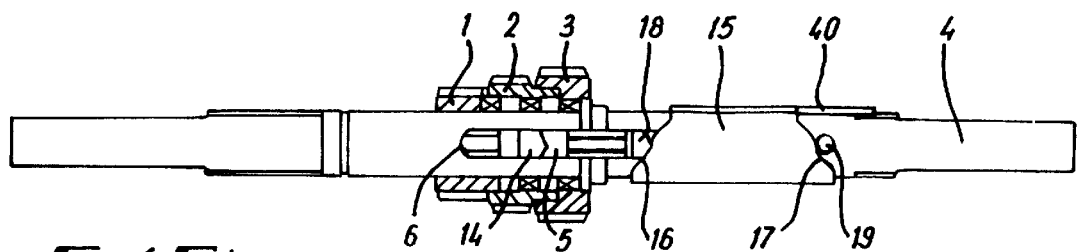
Figure 7:
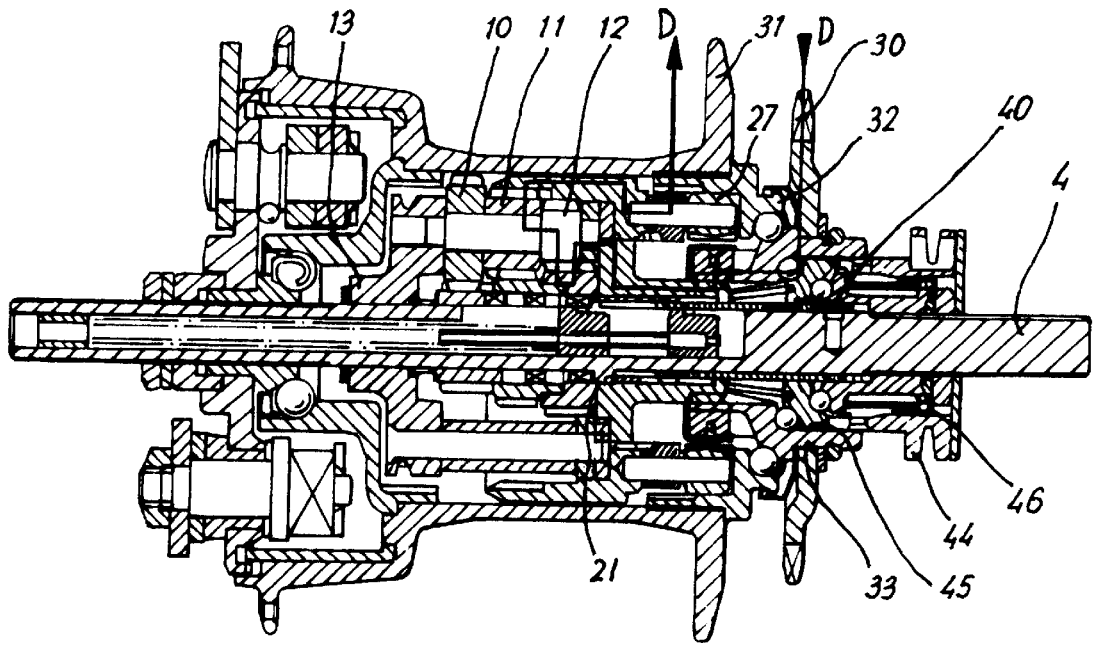
Figure 7A:
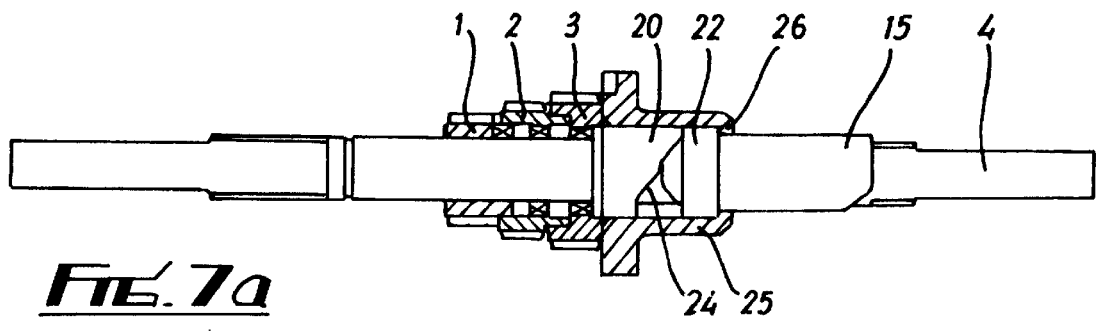
Figure 7B:
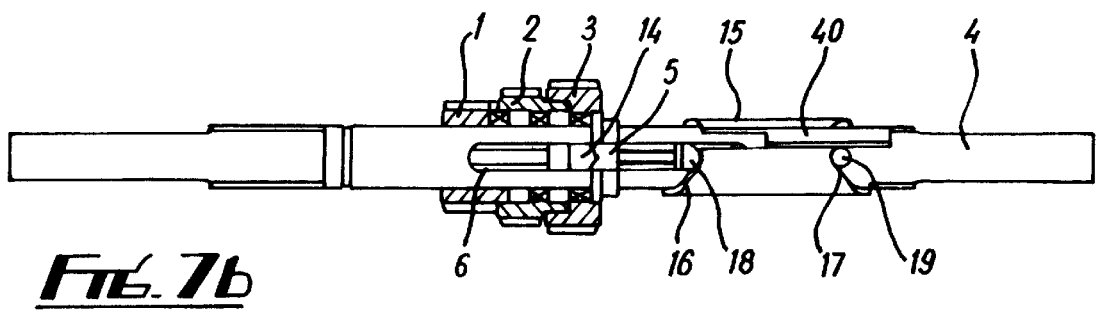

In order that the invention may be more clearly understood, embodiments thereof will now be described, by way of example, with reference to the accompanying drawings, in which:

FIG. 1 shows in section a gear system incorporating a selector according to the invention, with the system disposed in a first gear, FIG. 1a shows a part of the system of FIG. 1 in partial section, FIG. 1b also shows a part of the system of FIG. 1 in partial section, FIGS. 2, 2a and 2b correspond respectively to FIGS. 1, 1a and 1b but for the gear system in a second gear, FIGS. 3, 3a and 3b correspond respectively to FIGS. 1, 1a and 1b but for the gear system in a third gear, FIGS. 4, 4a and 4b correspond respectively to FIGS. 1, 1a and 1b but for the gear system in a fourth gear, FIGS. 5, 5a and 5b correspond respectively to FIGS. 1, 1a and 1b but for the gear system in a fifth gear, FIGS. 6, 6a and 6b correspond respectively to FIGS. 1, 1a and 1b but for the gear system in a sixth gear, FIGS. 7, 7a and 7b correspond respectively to FIGS. 1, 1a and 1b but for the gear system in a seventh gear.

Figure 8A:
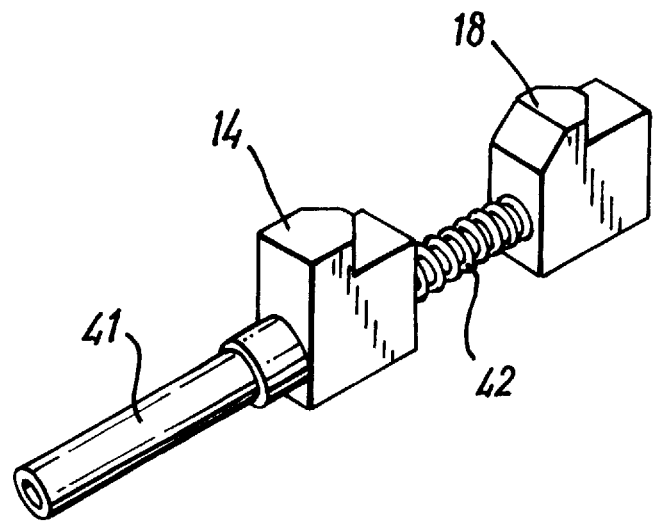
Figure 8B:
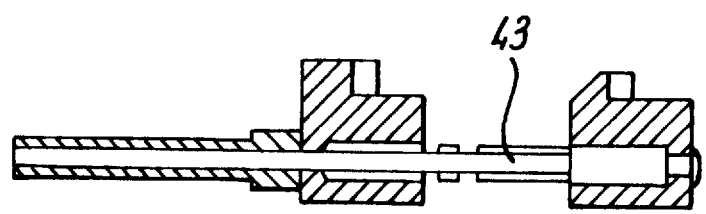

FIG. 8a shows a gear key assembly forming part of the system of FIG. 1 in more detail by means of an isometric view, and FIG. 8b shows a side elevational view in section of the key of FIG. 8a.

Referring to Figures 1, 1a and 1b, the change speed gear hub comprises sun pinions 1, 2 and 3 freely rotatably mounted in side-by-side disposition on a spindle 4. These sun pinions may be selectively locked relative to the spindle 4 by means of a gear selector key 5 movable axially in slot 6 formed in the spindle 4. In FIGS. 1, 1a and 1b, the gear selector key 5 is shown in a position in which it locks the sun pinion 3 relative to the spindle 4, the other sun pinions 1 and 2 being free to rotate on the spindle 4. Planet pinions 10, 11 and 12 rotatably mounted in a planet cage assembly indicated generally by the reference numeral 13 mesh respectively with sun pinions 1, 2 and 3.

The locking of the selected sun pinion relative to the spindle 4 is effected by means of a radially extending integral dog 14 formed on the selector key 5 which coacts with a complementary formation on the internal circumference of the sun pinion. By moving the key axially, the dog 14 may be aligned with the selected sun pinion. The key is moved axially by rotating and inner sleeve cam 15 which concentrically surrounds the spindle 4 opposite ends respectively of this inner sleeve cam 15 are angled to the plane at right angles to the axis of the spindle 4 and stepped at 16 and 17 to provide three different dwell portions for the gear selector key follower 18 and pin 19 which coact with the sleeve cam. Pin 19 is mounted in the spindle 4 and the gear selector key follower forms part of the selector key 5. The pin 19 may be rotatably mounted to facilitate operation of the sleeve cam. As the sleeve cam is rotated, pin 19 acts as a reaction pin on one end of the sleeve and the key 5 is axially displaced against the action of a helical spring or other resilient means (not shown) through the action of the other end of the sleeve on the gear selector key follower 18. The three dwell positions correspond to the three axial positions of the key 5. It will be appreciated that by having formations on both axial ends of the sleeve, the axial displacement of the key 5 may be doubled for a given rotational movement of the sleeve cam 15. It will also be appreciated, however, that only one end of the sleeve may be provided with formations, the other end being plain, or indeed both ends of the sleeve may be plain. By plain we mean that the end of the sleeve is in a plane at right angles to the axis of the sleeve and spindle so that when the sleeve is rotated the distance between gear selector key follower 18 and pin 19 remains constant.

An outer cam 20 is concentrically mounted on the spindle 4. This is restrained both axially and rotationally relatively to the spindle 4. This axial restraint is provided by a shoulder 21 formed on the spindle and the rotational restraint by the interaction of an axial projection in a slot. Additionally or alternatively the outer cam 20 may be fixed to the spindle 4. An outer cam follower 22 concentrically surrounds the inner sleeve 15. One end of this outer cam follower 22 comprises a cam face 23 which coacts with the cam face 24 of the outer cam 20 in a manner to be described later. Cam face 23 is shown on FIGS. 3a, 4a and 5a. A clutch 25 concentrically surrounds both the outer cam 20 and the outer cam follower 22. This clutch comprises a radially inwardly extending flange 26 which coacts with an abutment face on the outer cam follower 22.

In all of FIGS. 1 to 7 the drive line through the gear system is indicated by the letter D. In gears 1 to 3, the gear is selected by respectively locking sun pinions 1, 2 or 3 to the spindle 4 by means of the key 5. The drive line then passes through the respective one of the three sun pinions appropriate to the gear selected. In all of these three gears, the clutch 25 adapts the same positions as can be seen from FIGS. 1, 1a and 1b.

This clutch 25 disengages the pawls in a gear ring 27 so that drive through th gear train is input by the gear ring 27 and output by the planet cage 13 resulting in a gear reduction. The ratio of the gear reduction depends on the number of teeth on the meshing sun and planet pinions.

FIGS. 4, 4a and 4b show the hub in gear 4. In moving from gear 3 to gear 4 the clutch has changed its position in the axial sense under the rotational action of the inner sleeve cam 15 moving the cam follower 22 axial against the axial cam face 24 of the outer cam 20 but there is no change in the spacing between gear selector key follower 18 and pin 19.

The change in position of the clutch allows the pawls in the gear ring 27 to engage drive with hub 31 via ratchet teeth in a ball ring 32.

Therefore in fourth gear, the drive is direct from sprocket 30 to gear hub 31, not passing through any of the sun pinions 1, 2 and 3 or their corresponding planet pinions. Thus although sun pinion 1 is locked to the spindle 4 by the key 5 and sun pinions 2 and 3 are free to rotate about the spindle 4 in this gear, none of the sun pinions 1, 2 and 3 take any torque reaction, and none form part of the drive line affecting the resultant gearing.

Referring to FIGS. 5, 5a and 5b, to move to gear 5 from gear 4, the inner sleeve cam 15 is rotated further. This further rotation does not result in any change in the spacing between gear selector cam follower 18 and pin 19 (sun pinion 1 being locked to the spindle 4 by the key 5) but the positions of the outer cam follower and the clutch 25 are altered.

The clutch 25 is now engaged with the planet cage 13 and takes the drive directly from the sprocket 30 through the driver 33. Therefore the drive through the gear train is input to the planet cage 13 and output by the gear ring 27 resulting in a gear increase. The ratio of the gear increase depends on the number of teeth on the meshing sun and planet pinions. Therefore drive passes from the sprocket 30 to the hub 31 via sun pinions 1 and planet pinion 11.

Referring to FIG. 6, 6a and 6b, in order to move from gear 5 to gear 6, the inner sleeve cam 15 is rotated still further. In contrast to gears 4 and 5, this further rotation does result in a change in the spacing between gear selector key follower 18 and pin 19 thus once again introducing sun pinion 2 into the drive line, this sun pinion 2 being locked with respect to the spindle 4 by the key 5 and sun pinions 1 and 3 being free to rotate on this spindle 4. Clutch 25 remains in the same position as for gears 5 and 6 but outer cam follower 22 is further rotated by the rotation of the inner sleeve cam 15. Further rotational movement of the inner sleeve cam in this direction is prevented by the abutment of a key 40 connected to the sleeve with the pin 19.

FIGS. 8a and 8b show the gear selector key assembly in more detail in isometric view and in section respectively. The gear selector key assembly is made up of two main parts which are resiliently urged apart. These parts are the key with integral dog 14 and the key with cam follower 18. These two items are resiliently urged apart by resilient means in the form of a helical spring 42. A stepped ferrule 41 and a rod 43 control the separation distance of the integral dog 14 and the cam follower 18 of the key assembly and hold the assembly together.

The key with the integral dog 14 is free to slide on the rod 43, axially and rotationally although movement in a rotational sense will be restricted within the key assembly is fitted into slot 16 in the spindle 4. The key with the cam follower 18 is fixed securely to the rod 43.

The stepped ferrule 41 is fixed securely to the rod 43 to fix the maximum distance between the integral dog 14 and the cam follower 18. The resilient key selector key assembly overcomes any tendency of the selector mechanism to jam when the sleeve is rotated to advance the key axially but the key cannot advance because the required sun pinion is not in the correct position to accept it. The resilient two part key can be compressed by the movement of the sleeve until the sun pinion is in the correct position when the two parts are urged away from one another and one of them is urged into operative locking engagement with the required sun pinion.

All gear selections are actioned by the rotation of the key 40 around the spindle 4. The key is rotated by the gear change cone 45 which in turn is connected to the drum 44.

The drum is rotated by a control cable (not shown). The hub gear change is actioned by axial movements of the control cable rotating the drum 44 in one rotational sense with reverse rotation being achieved with torsional resilient means 46.

The means of rotating the drum 44 and the directions of operation can be modified to suit the application without affecting the operation of the sleeve cams.

It will be appreciated that the above embodiment has been described by way of example only and that many variations are possible without departing from the scope of the invention as defined by the appended claims.

I claim:

1. An epicyclic change speed gear comprising a fixed spindle (4), an input member (33) and an output member (31) planet pinions (10, 11, 12) disposed in a planet cage (13), a gear ring (27) is operatively connected to the output member (31) or input member (33), a clutch (25) operative to connect the input member (33) to the planet cage (13) or the input member (33) to the gear ring (27), side-by-side sun pinions (1,2,3) rotatable on the spindle (4) any one of which is operable to provide a reaction member when locked to the spindle (4) and a gear selector key (5) disposed radially inwardly of said sun pinions (1,2,3) and adapted for selective cooperative engagement with said only one of the said sun pinions (1,2,3) on movement of the selector key (5) in the axial direction of the hub in order to lock the corresponding sun pinion (1,2,3,) to the spindle (4) to provide the reaction member, and means for operating the selector key (5) to provide said selective cooperative engagement characterised by said means for operating the selector key (5) comprises a sleeve (15) disposed for rotational movement relative to the spindle (4), relative rotational movement of the sleeve resulting in axial movement of the selector key.

2. An epicyclic change speed gear as claimed in claim 1, in which at least one axial edge of the sleeve (15) is angled to the axis of the sleeve (15) so that on rotation of the sleeve (15) on the spindle (4) the axial extent of the sleeve (15) between a fixed point (19) on the spindle (4) and the selector key is varied thereby moving the key (5) axially with respect to that fixed point (19).

3. An epicyclic change speed gear as claimed in claim 2, in which a pin (19) is attached to the spindle (4) at the fixed point to form an abutment for the sleeve (15).

4. An epicyclic change speed gear as claimed in claim 3, in which the pin (19) is rotatable with respect to the sleeve (15).

5. An epicyclic change speed gear as claimed in claim 2, in which both axial ends of the sleeve are angled so that the axial displacement of the key is increased for a given rotational movement of the sleeve (15).

6. An epicyclic change speed gear as claimed in claim 5, in which the axial ends are similarly angled so that axial displacement of the key (5) is doubled for a given rotational movement of the sleeve (15).

7. An epicyclic change speed gear as claimed in claim 2, in which the or each angled edge is formed with steps (16,17) corresponding to given axial positions of the key (5) in which given sun pinions (1,2,3) are locked to the spindle (4).

8. An epicyclic change speed gear as claimed in claim 1, in which a cam and cam follower combination (20, 22) is provided operative to move the clutch (25) in order to connect the input member (33) to the planet cage (13) or the input member (33) to the gear ring (27).

9. An epicyclic change speed gear as claimed in claim 8, in which the cam follower (22) is keyed to the sleeve (15) and operative to move the clutch (25).

10. An epicyclic change speed gear as claimed in claim 8, in which the cam follower (22) is locked with respect to the sleeve (15) in the rotational sense but movable axially with respect thereto.

11. An epicyclic change speed gear as claimed in claim 8, in which the cam follower (22) coacts in operation with the cam (20) which provides a reaction surface causing axial movement of the cam follower (22) on rotation of the sleeve (15).

12. An epicyclic change speed gear as claimed in claim 8, in which the cam, cam follower combination, the pin (19) comprises the cam and the cam follower incorporates the cam surface.

13. An epicyclic change speed gear comprising a fixed spindle (4), an input member (33) and an output member (31), planet pinions (11) disposed in a planet cage (13), a gear ring (27) which is operatively connected to the output member (31) or input member (33), a clutch (25) operative to connect the input member (33) to the planet cage (13) or the input member (33) to the gear ring (27), sun pinions (2) locked to the spindle (4) characterised by a sleeve (15) disposed for rotational movement relative to the spindle (4) and has opposite axial ends at right angles to the axis of the sleeve (15) and a cam, cam follower combination is provided operative to move the clutch (25) in order to connect the input member (33) to the planet cage (13) or the input member (33) to the gear ring (27) on rotational movement of the sleeve (15) the cam follower (22) being keyed to the sleeve (15) and operative to move the clutch (25).

14. An epicyclic change speed gear as claimed in claim 13, in which the cam follower (22) is locked with respect to the sleeve (15) in the rotational sense but movable axially with respect thereto.

15. An epicyclic change speed gear as claimed in claim 13, in which the cam follower (22) coacts in operation with the cam (20) which provides a reaction surface causing axial movement of the cam follower (22) on rotation of the sleeve (15).

\* \* \* \* \*